United States Patent
Clark

[11] 3,888,110
[45] June 10, 1975

[54] APPARATUS FOR THE DETERMINATION OF THE THERMAL CONDUCTIVITY OF GASES

[76] Inventor: Anthony John Clark, 19, Crossways, Onslow Village, Guildford, Surrey, England

[22] Filed: Nov. 3, 1967

[21] Appl. No.: 680,477

Related U.S. Application Data

[63] Continuation-in-part of Ser. No. 397,578, Sept. 18, 1964, abandoned.

[30] Foreign Application Priority Data
Dec. 14, 1966 United Kingdom.............. 55959/66

[52] U.S. Cl. ................................................. 73/27
[51] Int. Cl. ........................................... G01n 31/00
[58] Field of Search..................... 73/27, 26, 25,

[56] References Cited
UNITED STATES PATENTS

| | | |
|---|---|---|
| 2,565,230 | 8/1951 | Hebler ................................ 73/27 |
| 2,596,992 | 5/1952 | Fleming .............................. 73/27 |
| 2,930,015 | 3/1960 | Blumer ............................... 73/26 |
| 3,007,333 | 11/1961 | Chadenson ......................... 73/27 |
| 3,184,953 | 5/1965 | Petrocelli ............................ 73/27 |
| 3,247,715 | 4/1966 | Vlasic et al. ................... 73/23.1 X |
| 3,337,780 | 8/1967 | Robbins ........................... 73/88.5 |

*Primary Examiner*—Richard C. Queisser

[57] ABSTRACT

An apparatus for the determination of the thermal conductivity of gases is constructed from two blocks of thermally-conducting material with at least one gasket there-between having perforations. In the space between the gasket and the blocks, at least one conductivity cell is defined of volume as low as 1 microliter or less. The detector element is made of resistance wire or thermistor and is arranged within the cell. Support wires may be provided which may be either fixed at each end of the resistance wire or one end may be sprung.

13 Claims, 6 Drawing Figures

3,888,110

PATENTED JUN 10 1975

SHEET 1

INVENTOR.
ANTHONY JOHN CLARK

BY *Jacobs & Jacobs*

ATTORNEYS

PATENTED JUN 10 1975　　　　　　　　3,888,110

SHEET　　2

INVENTOR.
ANTHONY JOHN CLARK
BY
Jacobs & Jacobs
ATTORNEYS

APPARATUS FOR THE DETERMINATION OF THE THERMAL CONDUCTIVITY OF GASES

The present invention relates to apparatus for use in the determination of the thermal conductivity of gases and is a continuation in part of copending application Ser. No. 397,578 filed Sept. 18, 1964, now abandoned.

As is well known the measurement of the thermal conductivity of gases provides one of the most widely used physical methods of gas detection. The most usual arrangement employed comprises flowing the gas stream over a heated wire whose resistance varies with temperature, which in turn depends on the thermal conductivity of the gas. The wire is formed as one arm of a Wheatstone bridge and the change in its resistance due to the cooling effect of the gas is observed as the degree of unbalance of the bridge. In a further embodiment of this method the gas stream may be caused to pass over two heated wires forming opposite arms of a Wheatstone bridge, while a reference gas is passed over two wires forming the other two arms of the bridge. This particular method of gas analysis has now assumed a new importance in the field of gas chromatography and, particularly in association with gas chromatography apparatus employing capillary columns, has necessitated new designs of thermal conductivity detectors of increased sensitivity and speed of response.

In thermal conductivity detectors employed hitherto the cells have usually been holes drilled in a metal block and containing the heated wire filaments. Where such a detector is employed to analyze the gases issuing from a chromatography column it has been found that the smaller the volume of the cell the better is the discrimination of the detector relative to each individual gas leaving the column. With chromatography apparatus using capillary columns, detector cells having a volume of only a few microlitres are most desirable, and it is the manufacture of cells of such small volume which has hitherto proved impossible.

It has now been found possible by application of a new method of construction to produce a cell of such a small volume. When used with normal capillary columns at flowrates, e.g. of the order of 1 ml. per minute, the cell thus constructed is similar in sensitivity to the flame ionization detector which involves a much more elaborate electrical circuit. Further advantages over flame ionization are that the apparatus of the present invention is readily made flame-proof and is not destructive of samples.

Accordingly the present invention is apparatus for use in the determination of the thermal conductivity of gases which comprises two blocks of a thermally conductive material separated by a perforated gasket, the assembly of blocks and gasket defining one or more enclosed cells having inlet and outlet ports, with substantially the total gas space of the cell lying within the thickness of the gasket, and at least one electrically heated detector element in each cell.

The blocks may be fabricated of any suitable thermally conductive material e.g. metal and in particular are fabricated of stainless steel or Duralumin. Where the gases to be analyzed are of a corrosive nature the faces of the blocks forming the sides of the cell may be plated with a suitable corrosion resistant metal e.g. platinum, rhodium, silver etc.

The gasket may also be fabricated of any suitable material which when held firmly between the blocks provides a gas tight seal. A suitable material is for exaple mica or anodised aluminium, on which the anodised layer can be extremely thin to provide an efficient electrical insulator with hardly any decrease in the efficiency of the gasket as a thermal conductor. The gasket may be formed as a laminar structure consisting of the main body sandwiched between two foils. The gasket is perforated in any suitable manner and usually has from one to four holes of any suitable configuration e.g. slots which, when the gasket is placed between the blocks, define with the faces of the blocks the conductivity cell. The dimensions of the perforations in the gasket may be so chosen as to provide cells of any volume down to the order of 1 microlitre.

In a preferred embodiment, the gasket has two perforations, which, when the apparatus is assembled, provide two enclosed cells. Each cell contains two detector elements. Sample gas, whose thermal conductivity is to be measured, is passed through the one cell and reference gas of known thermal conductivity is passed through the other. This arrangement places all four arms of the Wheatstone's bridge very close to each other, reducing the difficulty of maintaining the arms of the bridge in an environment at constant temperature.

The assembly of blocks and gasket may be held together for example by clamps or by screws or bolts passing through the assembly. The clamping together of the blocks must be carefully and evenly carried out, and this, combined with flat mating surfaces and accurate construction of the parts, may produce a cell which is absolutely gas tight without any sealing material. However, the sealing is facilitated by the use of the subsidiary foil gaskets.

The detector element may be a thermistor, or it may be formed as a wire of, for example, platinum or other wire with a suitably high temperature co-efficient of resistance, of thickness down to the order of 0.0001 of an inch. This may be supported by two wires of noble metal alloy which pass through insulators in one of the blocks and project from the block to a distance equal to half the thickness of the gasket system. The detector element is soldered or welded to the ends of these wires. One of these wires is free for some of its length within the block, and is sprung, thus providing a means for tensioning the detector element. Normally the dead space surrounding this spring is arranged to be on the downstream side of the gas flow, so that it does not contribute to the effective volume of the cell, but if in any particular application this volume is significant, it can be reduced to negligible proportions by being filled with packing except for the minute volume required for actual flexure of the spring. As an alternative means of supporting the resistance wire in each cell the gasket is fabricated of an insulating, heat resistant material e.g. mica and the resistance wire of the detector element is attached to the gasket so that the wire traverses the perforation defining the cell in the final assembled apparatus, the gasket with attached wires thus forming an independent replaceable unit.

The resistance wire or wires may be fixed to the gasket in any suitable manner e.g. with a suitable adhesive. Furthermore the resistance wires can be etched from a single thin sheet of resistance material, e.g. nickel or platinum. In this case a spring loop can be included in each etched wire.

In practice it is found necessary to arrange for the resistance wire to be stretched substantially across the centre of the volume space of the cell. This may be realized by fixing the wires in grooves in the gasket of depth equal to half its thickness. Preferably the wires may be fitted across one face of the gasket and in the final assembly a second gasket of the same thickness is sandwiched against the first so that the resistance wire stretches across the cell from between the two gaskets. This method automatically centres the wire in the cell.

Connection of the ends of the resistance wire through the cell block to means for measuring its electrical resistance e.g. a Wheatstone bridge circuit may be effected by contact wires passing through insulators in one of the blocks. These may be constructed to protrude slightly above the surrounding face of the block through which they pass and are positioned so that on assembly of the apparatus by sandwiching of the gasket bearing the resistance wires between the two cell blocks these wires are brought into physical contact with the ends of the resistance wires thereby completing the electric circuit with for example the Wheatstone bridge. Alternatively the ends of the wires passing through the insulators may be flattened and bent so as to press against the end of the resistance wire and in the case where two gaskets are employed to press against the end of the resistance wire and lie between the two gaskets. In addition to this alternative the contact between the ends of the contact wires and the resistance wire may be made by the use of thin metal shims similarly compressed between the gaskets.

In a further embodiment, electrical connection with the detector is made via areas on an insulating gasket coated with electrically conducting material. Each detector is electrically connected to an area of electrically conducting material on the gasket. Thus if there is one element there must be two conducting areas, and if there are two elements there must be four areas of conducting material. These areas may be on the same or separate sheet of gasket material and must be insulated from each other apart from connection through the detector. It will be appreciated that when the blocks of thermally conducting material are also electrically conducting, it will be necessary to provide additional insulation between the blocks and the areas of electrically conducting material on the gasket.

The electrically conducting material is most suitably applied by evaporation and condensation onto the gasket material. Any electrical conductor for which this technique is suitable may be used, for example base metals such as aluminium and noble metals, particularly gold.

The electrical connection between the electrically conducting areas on the gasket and the external wires of the Wheatstone's bridge may be made by attaching the wires to the coating on the gasket. However it is preferred that the ends of the wires should make pressure contact; for instance, they may be formed into flat tabs lying on the conducting areas so that when the apparatus is assembled firm contact is made with the conducting coating.

The main advantages accuring from the method of construction in accordance with the invention may be summarized as follows:

1. Very small cell volumes are attainable (down to the order of 1 microlitre or less), and this, combined with the low thermal inertia of the fine wires used, allows the complete resolution of the closest fractions emerging from a capillary gas chromatography column.

2. A further consequence of the very small volume is that the detector elements are close enough to the surrounding cell material to run relatively cool at high bridge currents. Thus a larger signal output per unit change of thermal conductivity can be obtained than with most other cells, and the chance of pyrolytic decomposition of samples is reduced.

3. The use of single wire detector elements keeps noise due to movement of the filament to a very low level. The straight wire, rather than the more common coiled filament, also contributes to the cool running mentioned above.

4. A positive gas seal is obtained, enabling the cell to be used at high and low pressures without special precautions.

5. The gasket and detector elements can be constructed as one readily replaceable unit. Thus if a filament burns out, a new gasket with a complete set of matched filaments can be inserted by the user, the arrangement being so robust that no special skill is needed.

6. All four arms of a Wheatsone's bridge can be mounted in the one gasket. This overcomes to a considerable extent the problems associated with variation in ambient temperature causing changes in the resistance of the arms of the bridge.

7. If mica or anodised aluminium gaskets are used, the device can be used at quite elevated temperatures, up to say 300°C.

The apparatus of the present invention is used to determine the thermal conductivity of gases in combination with means for measuring the electrical resistance of the detector elements. Such means may be for example a Wheatstone bridge circuit.

The apparatus of the present invention is described in more detail with reference to the accompanying drawings in which.

Figure 1:
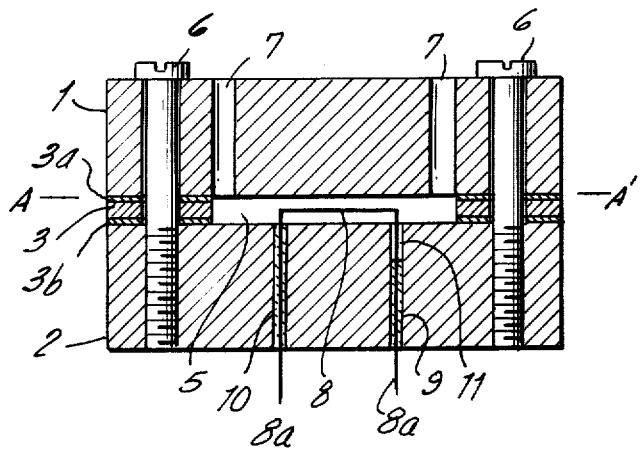
FIG. 1 represents a side elevation in section through one of the cells of the apparatus showing the novel method of construction.
Figure 2:
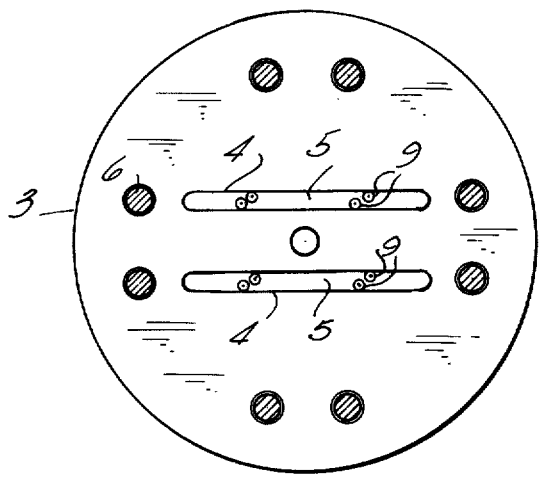
FIG. 2 represents a plan view in section about the line A – A' in FIG. 1.

Referring to FIG. 1 a particular embodiment of the apparatus of the present invention comprises Duralumin blocks 1 and 2 separated by a perforated aluminium gasket 3. The gasket is sandwiched between two subsidiary aluminium foil gaskets 3a and 3b. As shown in FIG. 2 the perforations take the form of slots 4 which define narrow elongated cells 5 when combined with the Duralumin blocks in the finished assembly.

The gasket is held between the blocks by screws 6 which pass through holes drilled in the assembly. The block 1 has drilled ports 7 providing for admission and withdrawal of gases from the cells. Each cell contains two platinum wires 8 running parallel the length of the cell. Thus space is saved by placing the elements forming two opposite arms of the Wheatstone bridge within the volume of one cell, instead of in two separate cells in series as is normally done. As stated earlier, this also overcomes the problem of maintaining all four arms of the Wheatstone bridge in a constant temperature environment. Thicker support wires 8a pass through holes drilled in the other block 2 and are soldered to the ends of the platinum wires. On assembly, the right hand wire 8a is held over towards the centre of the cell while the filament 8 is soldered to the support 8a. The right hand wire 8a is then freed and springs back, tensioning the filament. These support wires are insulated from the block by a suitable insulating packing 10 e.g. a ceramic material. As shown in FIG. 2 the holes 9 drilled in block 2 for the support wire insulation are staggered to allow the two wires 8 to run parallel, the cell being otherwise too narrow to allow room for this arrangement. In order to keep the detector wires taut within the cells, flexing of one of the support wires, 8a, is allowed in the region 11 by omitting the insulating packing material from the top of one of the pair of holes drilled through block 2 for each support wire.

Figure 3:
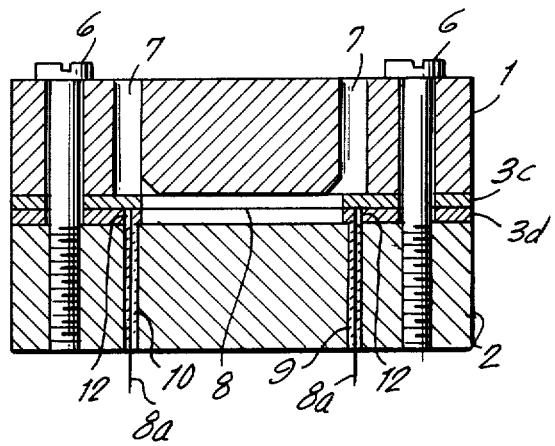
FIG. 3 represents a side elevation in section through the same cell as FIG. 1 having a different gasket and resistance wire supporting means.
Figure 4:
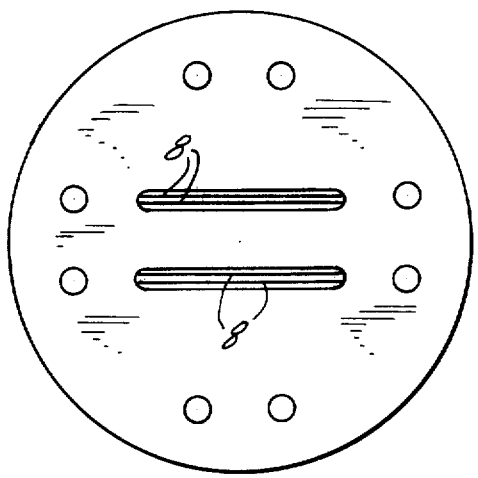
FIG. 4 represents a plan view of a gasket having attached resistance wires.

Referring to FIG. 3 this shows an alternative construction for the gasket and resistance wire supports, the gasket being formed as a laminar structure of two thinner gaskets 3c and 3d. In this case the ports 7 are chamfered at their inner edge as shown so as to direct the flow of gases through the cell. This arrangement also protects the resistance wires from any tubes etc. that might be inserted in the ports. The platinum wires 8 running parallel the length of the cell are cemented at each end to the gasket 3c. Thicker contact wires 8a pass through holes 9 drilled in the block 2 as before. These wires protrude above the surrounding face of the block and contact the ends of wire 8 by passing through holes 12 through the lower gasket 3d their ends being cylindrically curved to prevent damage to the resistance wires. In this embodiment the resistance wires can be tensioned by fine spring wires or supported by quartz fibres, or flat metal tabs of platinum iridium (not shown) similarly sandwiched between the mica gaskets at the sides of the slots. A plan view of a gasket having resistance wires affixed is shown in FIG. 4.

Figure 5:
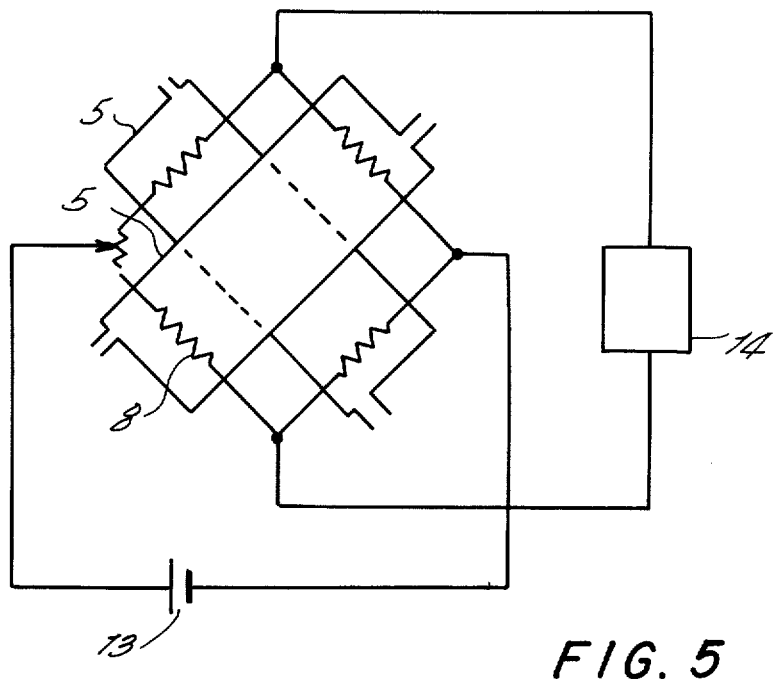
FIG. 5 represents schematically the apparatus of the invention in association with a Wheatstone bridge circuit for measuring the thermal conductivity of a gas stream.

Referring to FIG. 5, in operation the wires in each cell are connected as opposing arms of the Wheatstone bridge which is itself connected to a source of supply of electric current e.g. an accumulator or DC power supply 13. A potentiometer recorder 14 replaces the conventional galvanometer in the circuit.

Figure 6:
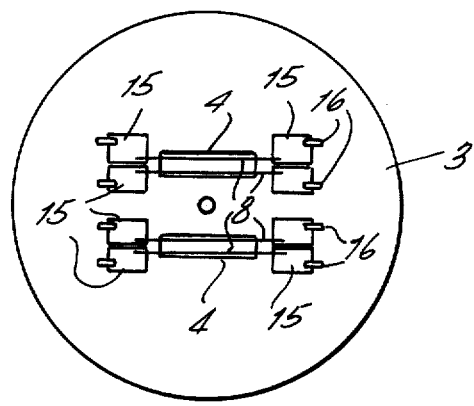
FIG. 6 shows a gasket bearing areas of a conducting material, via which electrical connection is made with the detector elements.

Referring to FIG. 6, a gasket 3 has slots 4 which deffine cells when the whole apparatus is assembled. Each cell is provided with two platinum wire detector elements 8 running parallel for the length of the cell. The elements each make contact with a gold area 15. The points at which the gold areas make contact with the Wheatstone's bridge are shown at 16. Other holes to enable the apparatus to be bolted together and to ensure that the gasket is located correctly in relation to other gaskets and blocks are not shown.

The wires are heated by passage of electric current and the sample gas to be analysed is passed through one cell and a suitable reference gas to balance out temperature changes is passed through the other cell. In chromatography work the reference gas usually takes the form of the carrier gas employed e.g. nitrogen or helium. The degree of unbalance of the bridge represents a measure of the thermal conductivity of the sample gas. By use of the potentiometer recorder 14 the degree of unbalance of the system can be shown visibly as a tracing on a moving chart. By continuously flowing the gas stream leaving a chromatographic column through one of the cells of the detector and a reference gas through the other and employing the above system it is possible to obtain a tracing from the recorder showing peaks for every component of the gas mixture separated by the column. By adjusting the potentiometer recorder to show zero deflection with reference gas passing through both cells, under normal operation of the instrument the area under a peak shown on the tracing corresponds to the amount of a particular component in the gas mixture. This provides a ready method of repetitive analysis of the gas stream. It also provides a method for indicating when the gas stream passing through the detector cell contains the maximum proportion of a particular component. This information can be of use if it is desired to separate this component for further analysis. Other uses of the apparatus will be apparent to those skilled in the art.

I claim:

1. Apparatus for use in the determination of the thermal conductivity of gases comprising two blocks of a thermally conductive material having inlet and outlet passages, the axes of said passages being offset from one another, a perforated gasket which separates the blocks of thermally conductive material and defines with the blocks an enclosed cell having inlet and outlet ports communicating with said passages, substantially the total gas volume space of the cell lying within the thickness of the gasket at least one electrically heated detector element supported within said cell and means for making electrical connections to said detector element from outside of said blocks the perforated gasket and detector elements being constructed substantially as one single readily replaceable unit and the volume of the enclosed cell is so small as to permit analysis of gases separated on a capillary chromatographic column without significant loss of resolution.

2. Apparatus according to claim 1 wherein the blocks of thermally conductive material contain two sets of inlet and outlet passages and the gasket contains two perforations to define with said blocks, two enclosed cells each having ports communicating with one set of inlet and outlet passages, two electrically heated detector elements supported in each cell, means for making electrical connections to said detector elements from outside said blocks whereby said detector elements may be connected to form the four arms of a Wheatstone bridge and all arms of the bridge may be maintained in a constant temperature environment.

3. Apparatus as claimed in claim 1 wherein the gasket is formed as a laminar structure comprising a main body sandwiched between two foils.

4. Apparatus as claimed in claim 1 wherein each detector element is a thermistor.

5. Apparatus as claimed in claim 1 wherein each detector element is a resistance wire stretched through the centre of the volume space of the cell.

6. Apparatus as claimed in claim 4 wherein said means for making electrical connections comprises electrically conductive support wires wherein said support wires pass through one of the blocks of thermally conductive material and are fixed one at each end of the said resistance wires.

7. Apparatus as claimed in claim 6 wherein one of the support wires is free for part of its length within the block of thermally conductive material and is sprung to provide a means for tensioning the resistance wire.

8. Apparatus as claimed in claim 1 wherein each detector element is a resistance wire stretched through the centre of the volume space of the cell and is attached at both ends to the gasket which is fabricated of an insulating heat resisting material.

9. Apparatus as claimed in claim 8 wherein said means for making electrical connections comprises two electrically conductive wires wherein said wires pass through one of the thermally conductive blocks and are held one at each end in physical contact with the resistance wire within the assembled apparatus.

10. Apparatus as claimed in claim 8 wherein the gasket of insulating heat resisting material is provided with areas of an electrically conducting material to which the resistance wire is electrically connected.

11. Apparatus as claimed in claim 10 wherein said means for making electrical connections comprises two electrically conductive wires wherein said wires pass through one of the thermally conductive blocks and are held at each end in physical contact with an area of electrically conducting material.

12. Apparatus as claimed in claim 1 wherein the electrically conducting material is aluminium or gold.

13. Apparatus as claimed in claim 8 comprising in addition spring wires wherein said spring wires tension and resistance wires attached to the gasket.

* * * * *